US012719081B2

(12) United States Patent
Hwang

(10) Patent No.: US 12,719,081 B2
(45) Date of Patent: Aug. 25, 2026

(54) METHOD FOR MANUFACTURING ALL-SOLID-STATE BATTERY

(71) Applicant: LG ENERGY SOLUTION, LTD., Seoul (KR)

(72) Inventor: Sunwoo Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 422 days.

(21) Appl. No.: 18/286,106

(22) PCT Filed: Jan. 3, 2023

(86) PCT No.: PCT/KR2023/000095
§ 371 (c)(1),
(2) Date: Oct. 6, 2023

(87) PCT Pub. No.: WO2023/136534
PCT Pub. Date: Jul. 20, 2023

(65) Prior Publication Data
US 2024/0186567 A1 Jun. 6, 2024

(30) Foreign Application Priority Data
Jan. 11, 2022 (KR) ........................ 10-2022-0003900

(51) Int. Cl.
*H01M 10/0562* (2010.01)
*H01M 10/052* (2010.01)
*H01M 10/0583* (2010.01)

(52) U.S. Cl.
CPC ..... *H01M 10/0562* (2013.01); *H01M 10/052* (2013.01); *H01M 10/0583* (2013.01); *H01M 2300/0068* (2013.01)

(58) Field of Classification Search
CPC ........... H01M 10/0562; H01M 10/052; H01M 10/0583; H01M 2300/0068; H01M 10/0585; Y02E 60/10; Y02P 70/50
See application file for complete search history.

(56) References Cited

U.S. PATENT DOCUMENTS

2008/0081257 A1* 4/2008 Yoshida ............ H01M 10/0562 429/209
2010/0015529 A1 1/2010 Kim et al.
2011/0052964 A1* 3/2011 Kim .................... H01M 50/417 429/152
2016/0028064 A1 1/2016 Choi et al.
2018/0083307 A1 3/2018 Makino et al.
2018/0287209 A1 10/2018 Hasegawa et al.
2018/0309134 A1 10/2018 Honda
2020/0251783 A1* 8/2020 Shimizu ................ H01M 4/043
2020/0328449 A1 10/2020 Ohta et al.
2020/0343579 A1 10/2020 Shimizu et al.
(Continued)

FOREIGN PATENT DOCUMENTS

CN 107615553 A 1/2018
CN 108365274 A 8/2018
(Continued)

*Primary Examiner* — Chinyere Mpamugo
(74) *Attorney, Agent, or Firm* — Bryan Cave Leighton Paisner LLP

(57) ABSTRACT

The present disclosure relates to a method for manufacturing an all-solid-state battery, which has a simple manufacturing process, allows more electrodes to be stacked in a desired size, and facilitates alignment between electrodes.

10 Claims, 8 Drawing Sheets

(56) References Cited

U.S. PATENT DOCUMENTS

| | | | | |
|---|---|---|---|---|
| 2020/0343591 | A1* | 10/2020 | Ohta | H01M 50/466 |
| 2020/0373624 | A1 | 11/2020 | Choi et al. | |
| 2022/0102760 | A1 | 3/2022 | Fukui | |
| 2023/0100167 | A1* | 3/2023 | Ogata | H01M 4/38<br>429/218.1 |

FOREIGN PATENT DOCUMENTS

| | | | |
|---|---|---|---|
| CN | 111864257 | A | 10/2020 |
| CN | 111987365 | A | 11/2020 |
| EP | 3667801 | A1 | 6/2020 |
| JP | H10-208773 | A | 8/1998 |
| JP | 2006261008 | A | 9/2006 |
| JP | 2008078119 | A | 4/2008 |
| JP | 2011507184 | A | 3/2011 |
| JP | 5081348 | B2 | 11/2012 |
| JP | 2013127861 | A | 6/2013 |
| JP | 2015220101 | A | 12/2015 |
| JP | 2016535401 | A | 11/2016 |
| JP | 2018-181451 | A | 11/2018 |
| JP | 2019-200890 | A | 11/2019 |
| JP | 2020-113434 | A | 7/2020 |
| JP | 2020-126769 | A | 8/2020 |
| JP | 2020-173955 | A | 10/2020 |
| JP | 2020181668 | A | 11/2020 |
| KR | 10-2009-0064021 | A | 6/2009 |
| KR | 10-0907623 | B1 | 7/2009 |
| KR | 10-0910624 | B1 | 8/2009 |
| KR | 10-2013-0102869 | A | 9/2013 |
| KR | 10-2016-0078884 | A | 7/2016 |
| KR | 10-2256465 | B1 | 6/2021 |
| WO | 2021/250803 | A1 | 12/2021 |

* cited by examiner

【Figure 1】
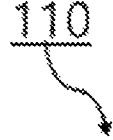
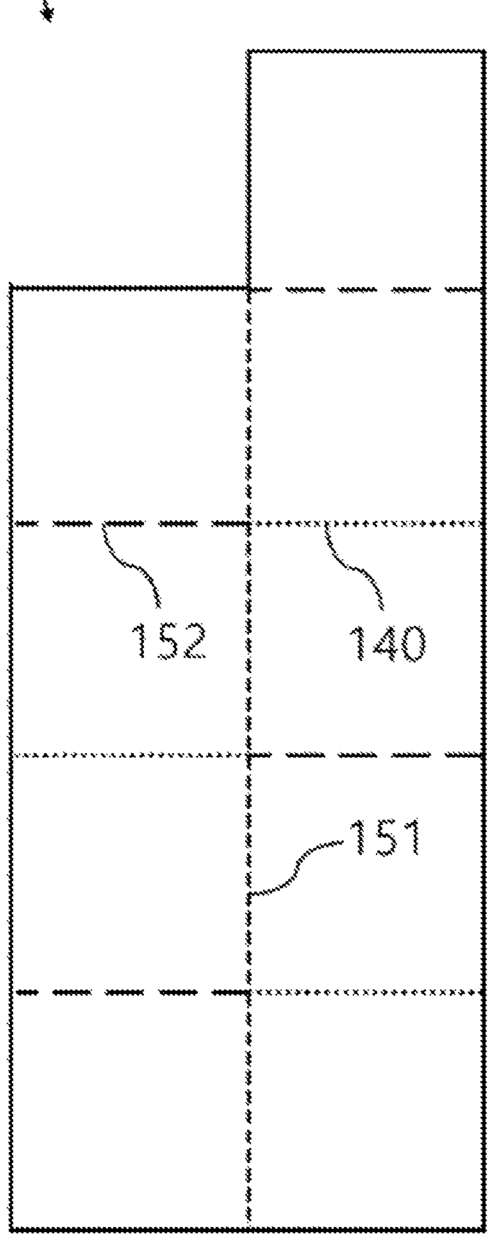

【Figure 2】
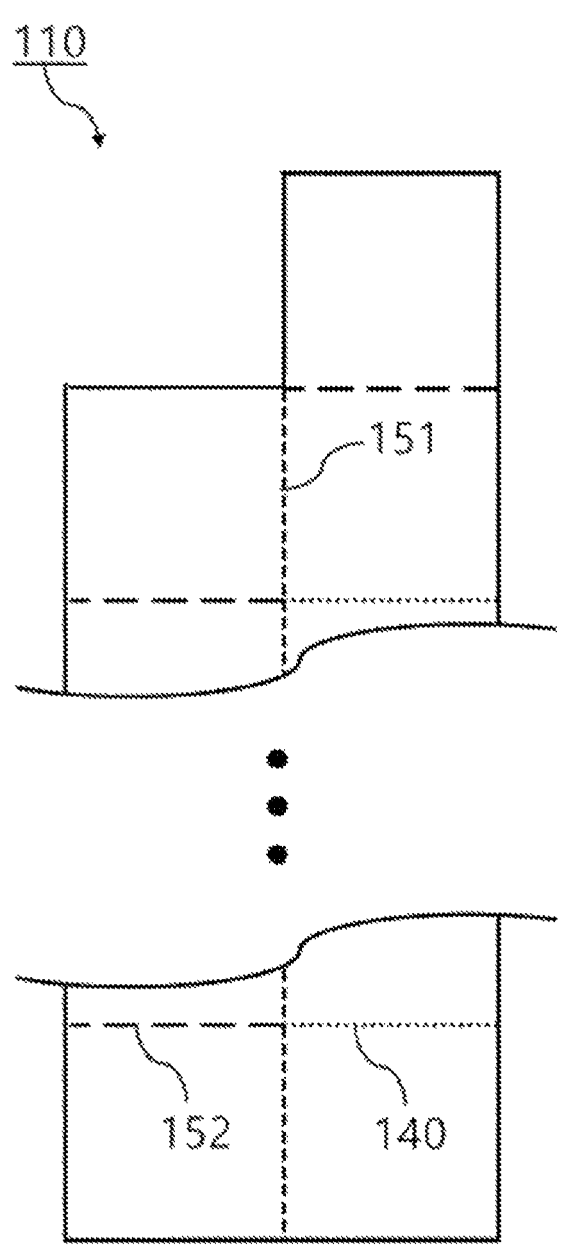

【Figure 3】
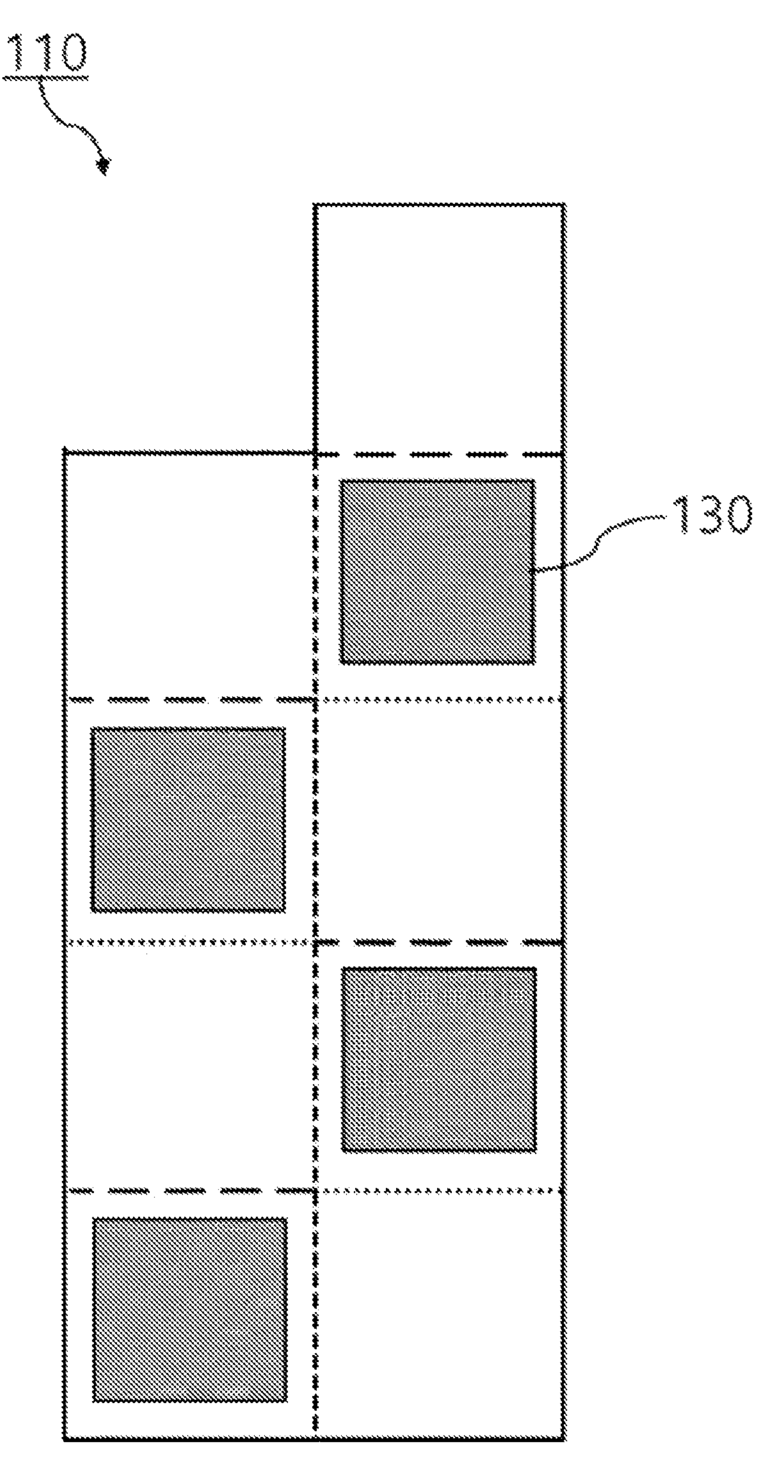

【Figure 4】
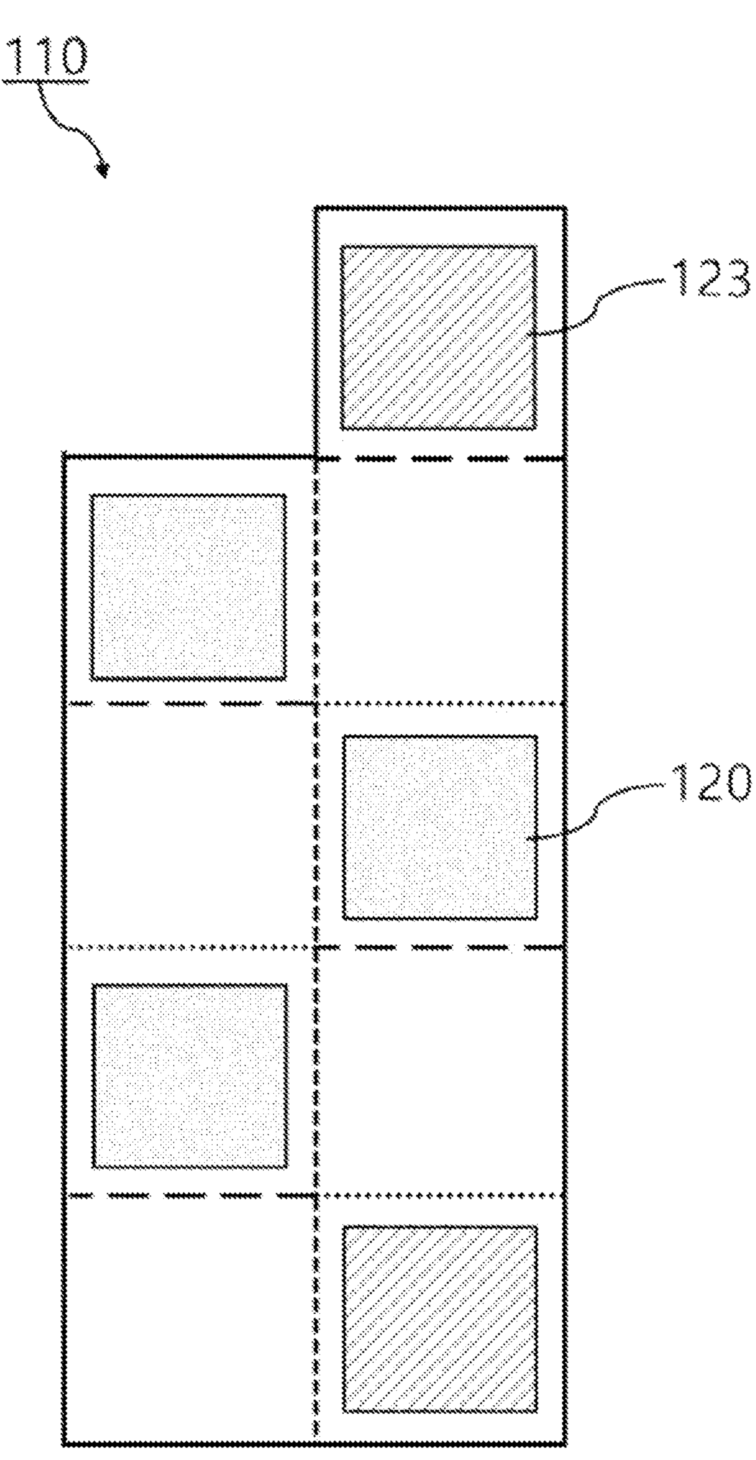

【Figure 5】
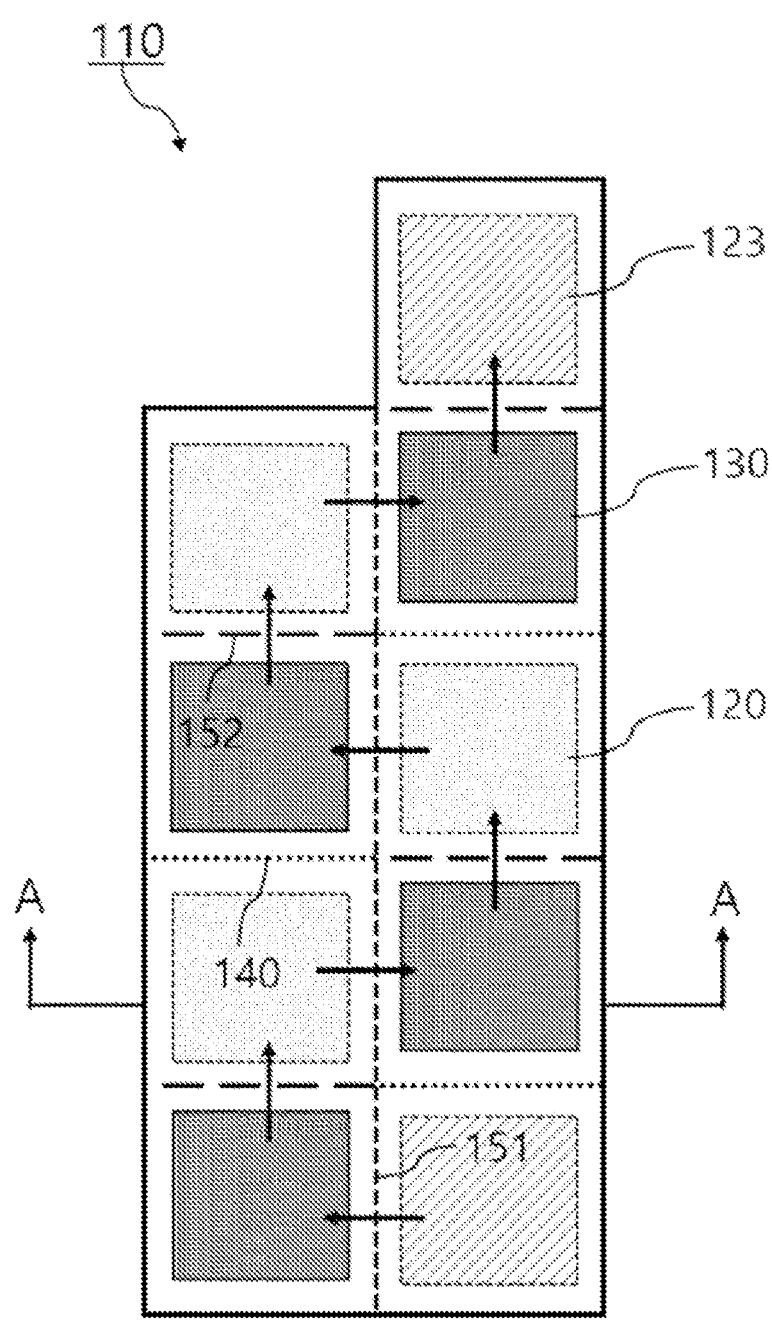

【Figure 6】
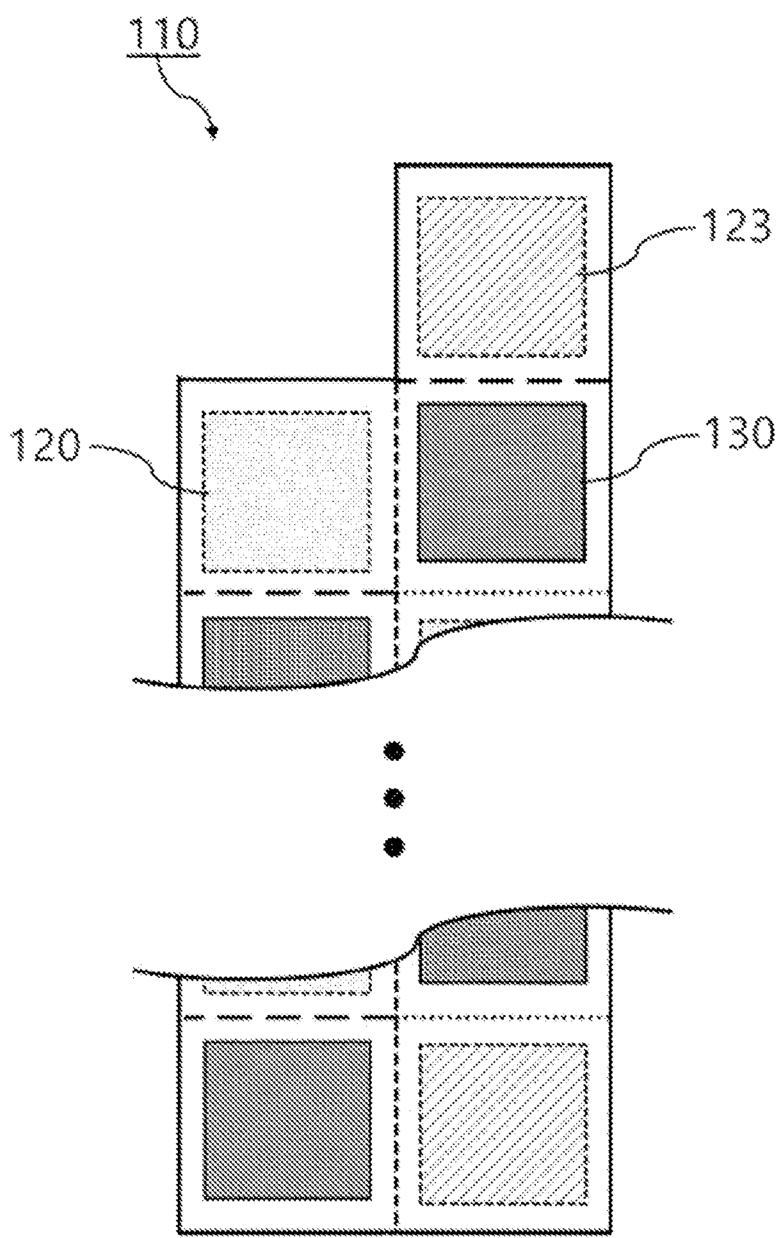

【Figure 7】
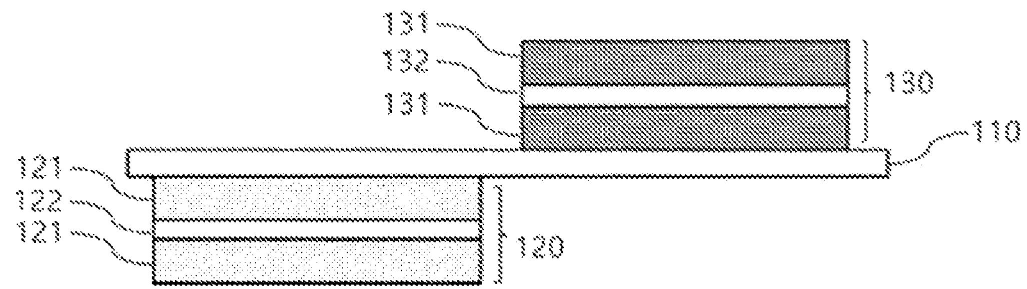

【Figure 8】
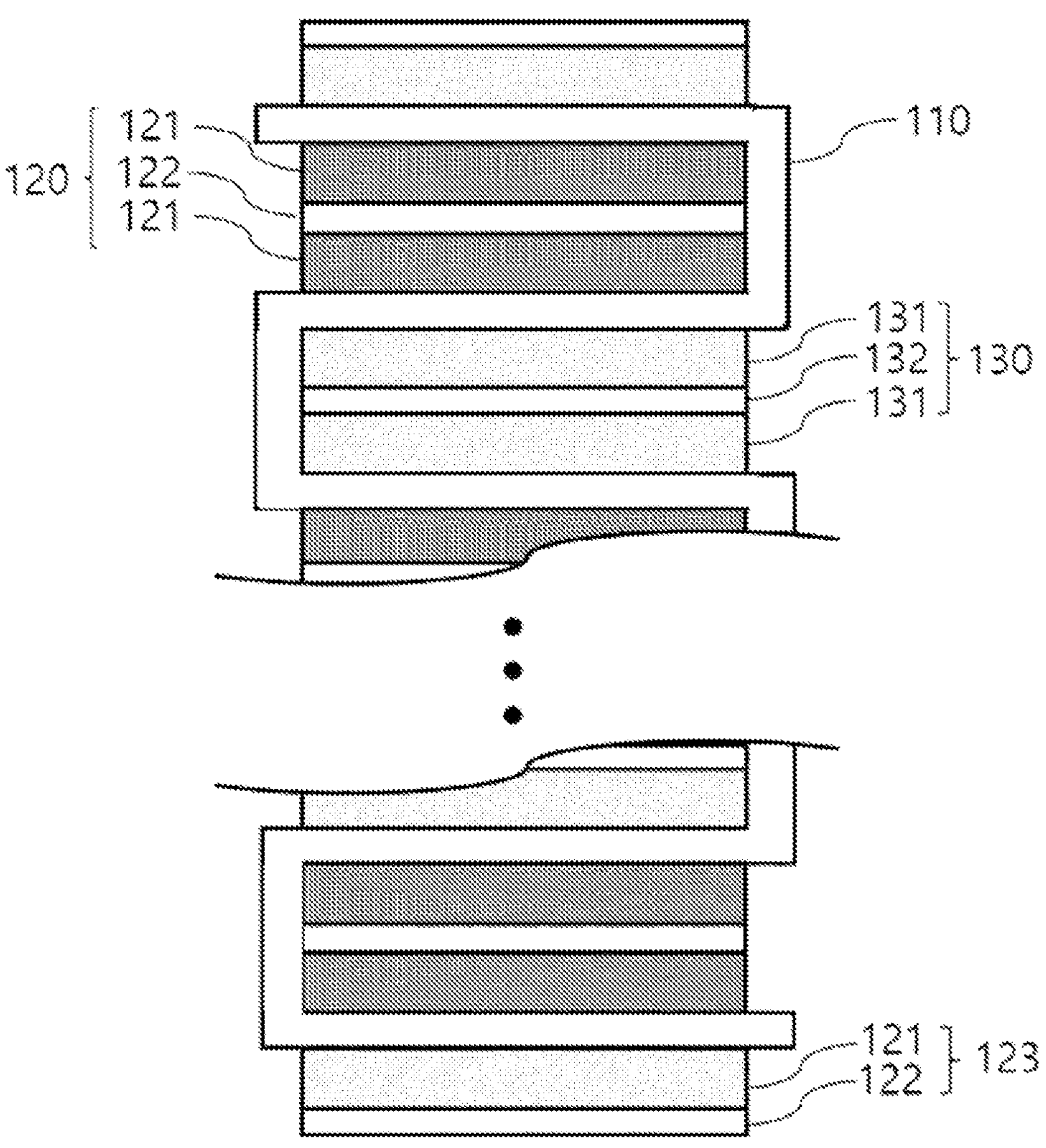

METHOD FOR MANUFACTURING ALL-SOLID-STATE BATTERY

CROSS-REFERENCE TO RELATED APPLICATIONS

This application is a National Phase entry pursuant to 35 U.S.C. § 371 of International Application No. PCT/KR2023/000095, filed on Jan. 3, 2023, and claims the benefit of and priority to Korean Patent Application No. 10-2022-0003900, filed on Jan. 11, 2022, the disclosures of which are incorporated by reference in their entirety for all purposes as if fully set forth herein.

TECHNICAL FIELD

The present disclosure relates to a method for manufacturing an all-solid-state battery.

BACKGROUND

A secondary battery refers to a device that converts external electrical energy into chemical energy, and then stores it, and generates electricity when needed. It is also called a rechargeable battery, meaning it can be recharged multiple times. Commonly used secondary batteries comprise a lead-acid battery, a nickel-cadmium battery (NiCd), a nickel-hydrogen battery (NiMH), and a lithium secondary battery. The secondary batteries provide both economic and environmental advantages over primary batteries that are used once and then discarded.

Meanwhile, as wireless communication technology is gradually developed, the light weight, thinning, miniaturization, etc. of portable devices or automobile accessories are required, and thus the demand for secondary batteries used as energy sources for these devices is increasing. In particular, as hybrid vehicles and electric vehicles are put into practical use in terms of preventing environmental pollution, there are researches to reduce the manufacturing cost and weight of the battery and to extend the lifetime, by using secondary batteries in batteries for these next-generation vehicles. Among various secondary batteries, a lithium secondary battery that is lightweight, exhibits high energy density and operating potential, and has a long cycle lifetime, has recently been in the spotlight.

In general, the lithium secondary battery is manufactured by mounting an electrode assembly composed of a negative electrode, a positive electrode, and a separator inside a cylindrical or prismatic metal can or a pouch-type case of an aluminum laminate sheet, and injecting electrolyte into the electrode assembly.

As an electrolyte for a conventional lithium secondary battery, a liquid-state electrolyte obtained by dissolving a lithium salt in a non-aqueous organic solvent has been mainly used. However, since such a liquid electrolyte has not only a high possibility of deterioration of electrode materials and volatilization of organic solvents, but also causes combustion or explosion due to an increase in the ambient temperature and the temperature of the battery itself and has a risk of leakage, it is difficult to implement various types of lithium secondary batteries with high safety.

Meanwhile, an all-solid-state battery using solid electrolyte has the advantage of being able to manufacture an electrode assembly in a safe and simple form because it excludes organic solvents.

All-solid-state batteries can be classified into oxide-based, polymer-based, and sulfide-based depending on the raw material of the solid electrolyte. A sulfide-based all-solid-state battery is attracting attention because its lithium-ion conductivity is superior to that of other types of batteries. However, despite its excellent characteristics, since it has higher ion conductivity and electric resistance between positive and negative electrodes than liquid batteries, there is a disadvantage that the lifetime and output are lower than those of batteries using conventional liquid electrolytes.

In order to improve the lifetime and output of the unit cell, a method can be considered, which differs in the positive electrode or the negative electrode, the type of the solid electrolyte, or the assembly method. In particular, when considering that the lifetime of a unit cell depends on the content of lithium in the negative electrode, forming a secondary battery using lithium metal as a negative electrode is effective in increasing lifetime.

Lithium metal could not be used in secondary batteries using conventional electrolyte solution due to safety issues caused by the reactivity of lithium metal itself, but when using a solid electrolyte, safety can be ensured by not using an electrolyte solution. With regard to dendrites generated when lithium metal is used, their generation is suppressed through various studies.

In unit cells containing a solid electrolyte, the performance of the unit cell can be improved by pressurizing the positive electrode, the solid electrolyte, and the negative electrode, and thus reducing the interfacial resistance. However, unlike conventional batteries using copper or graphite as a negative electrode, since lithium metal has a soft property, there may be differences in the capacity and the performance of the unit cell, and the safety depending on the degree and time of pressurization. If the lithium metal is pressurized at high pressure, the lithium metal and the solid electrolyte may react and cause a cell short. As a result, since the negative electrode, the positive electrode, and the solid electrolyte cannot be pressurized at once, there is a problem that the manufacturing process is complicated and it is difficult to align the electrodes to be stacked.

Therefore, there is a need for research on a manufacturing method capable of solving the above problems.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

It is an object of the present disclosure to provide a method for manufacturing an all-solid-state battery in which more electrodes can be stacked in a desired size, alignment between electrodes is easy, and the manufacturing method is simple.

Technical Solution

In order to achieve the above object, the present disclosure provides a method for manufacturing an all-solid-state battery, comprising the steps of:

(1) providing an all-solid-state electrolyte layer sheet;

(2) compartmentalizing the all-solid-state electrolyte layer sheet to accommodate two electrodes disposed apart from each other in a width direction and two or more pairs of electrodes disposed apart from each other in a longitudinal direction;

(3) laminating first electrodes having a first polarity on a front side of the compartmented all-solid-state electrolyte layer sheet in a zigzag pattern;

(4) laminating second electrodes having a second polarity different from the first polarity on a rear side of the compartmented all-solid-state electrolyte layer sheet on which the first electrodes having the first polarity are not laminated on the front side; and (5) folding and stacking the all-solid-state electrolyte layer sheet in which the first and second electrodes are laminated so that each of the first electrodes and each of the second electrodes are stacked in turn in a state without contacting with each other.

In one embodiment of the present disclosure, the step (3) is performed by selecting one of the compartment unit groups connected in the diagonal direction among the compartment units compartmentalized on the front side of the all-solid-state electrolyte layer sheet, and then laminating the first electrodes having the first polarity.

In one embodiment of the present disclosure, the present disclosure may further comprise a step of cutting spaced parts in the width direction of the all-solid-state electrolyte layer sheet having the disposed electrodes in a zigzag pattern based on a center line of the spaced part in the longitudinal direction, after step (2) and before step (3), or after step (4) and before step (5).

In one embodiment of the present disclosure, the cut all-solid-state electrolyte layer sheet may be folded at the spaced part that is not cut starting from the electrode adjacent to a cutting part of a distal end in the longitudinal direction to sequentially stack the first and second electrodes in turn via the all-solid-state electrolyte layer sheet.

In one embodiment of the present disclosure, the first electrode may be a negative electrode or a positive electrode.

In one embodiment of the present disclosure, the electrodes of the uppermost part and the lowermost part of the stacked all-solid-state electrolyte layer sheet may be single-sided electrodes in which an electrode active material is applied only to one surface of a current collector.

In one embodiment of the present disclosure, the single-sided electrodes of the uppermost part and the lowermost part may have the same polarity.

In one embodiment of the present disclosure, the electrodes except for the single-sided electrode may be double-sided electrodes in which an electrode active material of the same polarity is applied to both sides of the current collector.

In one embodiment of the present disclosure, the method of the present disclosure may further comprise a pressurizing step after step (5).

In one embodiment of the present disclosure, a solid electrolyte of the all-solid-state electrolyte layer sheet may comprise a sulfide-based solid electrolyte.

In one embodiment of the present disclosure, the first electrode having the first polarity or the second electrode having the second polarity is a negative electrode, and a negative electrode active material may be a lithium metal or a lithium alloy.

Advantageous Effects

The method for manufacturing an all-solid-state battery of the present disclosure has the effect that it has a simple manufacturing process, allows more electrodes to be stacked in a desired size, and also facilitates alignment between electrodes.

BRIEF DESCRIPTION OF DRAWINGS

FIG. 1 and FIG. 2 are views showing the compartmentalized all-solid-state electrolyte layer sheet.

FIG. 3 is a view showing the front side of an all-solid-state electrolyte layer sheet in which electrodes having one polarity are laminated in a zigzag pattern according to an embodiment of the present disclosure.

FIG. 4 is a view showing the rear side of an all-solid-state electrolyte layer sheet in which electrodes having a different polarity from the electrodes on the front side are laminated in a compartment where electrodes are not laminated on the front side, on the rear side of the all-solid-state electrolyte layer sheet in FIG. 3.

FIG. 5 and FIG. 6 are views showing the all-solid-state electrolyte layer sheet in which the positive electrode and the negative electrode are laminated.

FIG. 7 is a view showing a cross section of line A-A of FIG. 5.

FIG. 8 is a view showing the all-solid-state battery manufactured by the method of manufacturing an all-solid-state battery according to an embodiment of the present disclosure.

DETAILED DESCRIPTION

Hereinafter, based on the accompanying drawings, the present disclosure will be described in detail so that those skilled in the art can easily practice the present disclosure. However, the present disclosure can be implemented in many different forms, and is not limited to the embodiments described herein.

In order to clearly describe the present disclosure, parts irrelevant to the description are omitted, and the same reference numerals are assigned to the same or similar components throughout the specification.

In addition, the terms and words used in the present specification and claims should not be construed as limited to ordinary or dictionary terms, and should be construed in a sense and concept consistent with the technical idea of the present disclosure, based on the principle that the inventor can properly define the concept of a term to describe his invention in the best way possible.

Hereinafter, embodiments will be described in detail with reference to the accompanying drawings. However, the present disclosure may be embodied in many different forms and is not limited to the embodiments described herein.

Among conventional all-solid-state batteries, if an all-solid-state battery using a sulfide-based solid electrolyte as a solid electrolyte is manufactured by a roll-to-roll pressurization method, there was a problem that interfacial contact was difficult because many pores were generated inside the electrode. In order to solve this problem, a three dimensional pressurization method was performed through the pressurization of the hydrostatic pressure method, but the size of the battery that can be pressurized was limited according to the chamber size of the isostatic pressurization equipment.

In addition, if the negative electrode uses as lithium metal, when pressurizing together a negative electrode, a positive electrode, and an all-solid-state electrolyte layer sheet, the applied pressure may be different due to the low hardness of lithium metal. For this reason, if lithium metal is used as a negative electrode, it was not possible to pressurize the negative electrode, the positive electrode, and the all-solid-state electrolyte layer sheet at once. That is, in order to manufacture an all-solid-state battery, it is necessary to repeat the complicated process comprising stacking a negative electrode on an all-solid-state electrolyte layer sheet and then pressurizing them, stacking an all-solid-state electrolyte layer sheet on them and then pressurizing them, stacking a positive electrode on them and then pressurizing them, and thus as the above processes are repeated, there is a problem that it is difficult to align the stacked electrodes.

Accordingly, the present disclosure is intended to provide a method for manufacturing an all-solid-state battery that can solve the above problems.

The present disclosure relates to a method for manufacturing an all-solid-state battery, specifically to a method for manufacturing an all-solid-state battery, including the steps of:

(1) preparing an all-solid-state electrolyte layer sheet;
(2) compartmentalizing the all-solid-state electrolyte layer sheet so that two electrodes are disposed apart from each other in the width direction and two or more pairs of electrodes disposed apart from each other are disposed apart from each other in the longitudinal direction;
(3) laminating electrodes having one polarity on the front side of the compartmented all-solid-state electrolyte layer sheet in a zigzag pattern;
(4) laminating electrodes having a polarity different from that of the electrode on the front side in the compartment, in which electrodes having one polarity are not laminated on the front side, among the rear sides of the all-solid-state electrolyte layer sheet; and
(5) folding and stacking all-solid-state electrolyte layer sheets in which the electrodes are laminated so that the electrodes are stacked in a state in which they are not in contact with each other.

Step (1) is a step of preparing an all-solid-state electrolyte layer sheet.

The solid electrolyte of the all-solid-state electrolyte layer sheet may preferably include a sulfide-based solid electrolyte.

The sulfide-based solid electrolyte includes sulfur (S) and has ionic conductivity of a metal belonging to group 1 or group 2 of the periodic table, which may include Li—P—S-based glass or Li—P—S-based glass ceramics. Non-limiting examples of such a sulfide-based solid electrolyte may be $Li_2S—P_2S_5$, $Li_2S—LiI—P_2S_5$, $Li_2S—LiI—Li_2O—P_2S_5$, $Li_2S—LiBr—P_2S_5$, $Li_2S—Li_2O—P_2S_5$, $Li_2S—Li_3PO_4—P_2S_5$, $Li_2S—P_2S_5$, $Li_2S—P_2S_5—SiS_2$, $Li_2S—P_2S_5—SnS$, $Li_2S—P_2S_5—Al_2S_3$, $Li_2S—GeS_2$, $Li_2S—GeS_2—ZnS$ and the like, and may include one or more of these. However, it is not particularly limited thereto.

The method of manufacturing the all-solid-state electrolyte layer sheet is not particularly limited as long as it is used in the art. For example, it may be prepared by preparing a slurry containing the sulfide-based solid electrolyte, and then applying the slurry on a sheet, and drying and rolling it.

Step (2) is a step of compartmentalizing the all-solid-state electrolyte layer sheet so that two electrodes are disposed apart from each other in the width direction and two or more pairs of electrodes disposed apart from each other are disposed apart from each other in the longitudinal direction, and FIG. 1 is a view showing the compartmentalized all-solid-state electrolyte layer sheet 110.

The two or more electrode pairs may be disposed spaced apart from each other in the longitudinal direction, and in this case, the number of electrode pairs disposed is not particularly limited, and as shown in FIG. 2, electrode pairs can be arranged in the longitudinal direction of the all-solid-state electrolyte layer sheet as many as the number of electrode pairs to be stacked. Therefore, the all-solid-state electrolyte layer sheet 110 can be compartmentalized by the number of electrode pairs to be stacked.

Step (3) is a step of laminating electrodes having one polarity on the front side of the compartmented all-solid-state electrolyte layer sheet in a zigzag pattern.

FIG. 3 is a view showing the front side of an all-solid-state electrolyte layer sheet 110 in which electrodes having one polarity are laminated in a zigzag pattern according to an embodiment of the present disclosure. The electrode having one polarity may be a positive electrode or a negative electrode, and FIG. 3 is the negative electrode 130 as an example.

The lamination of the electrodes having one polarity in a zigzag pattern is performed by selecting one of the compartment unit groups connected in the diagonal direction among the compartment units compartmentalized on the front side of the all-solid-state electrolyte layer sheet, and then laminating electrodes having one polarity. That is, among the compartment units compartmentalized on the front side of the all-solid-state electrolyte layer sheet, there are two compartment unit groups connected in the diagonal direction to each other, and only one group of them is selected and laminated.

If the electrodes are laminated as described above, no electrodes are laminated in compartment units adjacent in the longitudinal direction and compartment units adjacent in the width direction based on any one compartment unit in which electrodes are laminated.

Step (4) is a step of laminating electrodes having a polarity different from that of the electrode on the front side in the compartment, in which electrodes having one polarity are not laminated on the front side, among the rear sides of the all-solid-state electrolyte layer sheet.

FIG. 4 is a view showing the rear side of the all-solid-state electrolyte layer sheet 110 according to an embodiment of the present disclosure. On the rear side, electrodes are laminated in a compartment in which electrodes are not laminated on the front side, and the electrodes laminated on the rear side may be electrodes having a different polarity from the electrodes on the front side. The electrodes shown in FIG. 4 are examples of positive electrodes 120, 123.

That is, in the all-solid-state electrolyte layer sheet 110 in which the positive electrodes 120, 123 and the negative electrode 130 are laminated according to an embodiment of the present disclosure, the negative electrode 130 may be laminated on the front side, and the positive electrodes 120, 123 may be laminated on the rear side.

Also, in the all-solid-state electrolyte layer sheet 110 in which the positive electrodes 120, 123 and the negative electrode 130 are laminated according to another embodiment of the present disclosure, the positive electrodes 120, 123 may be laminated on the front side, and the negative electrode 130 may be laminated on the rear side.

FIG. 5 is a view showing an all-solid-state electrolyte layer sheet 110 in which the positive electrodes 120, 123 and the negative electrode 130 are laminated. In this case, the negative electrode 130 is laminated on the front side of the all-solid-state electrolyte layer sheet 110, and the positive electrodes 120, 123 are laminated on the rear side of the all-solid-state electrolyte layer sheet 110.

As described above in step (2), since the number of electrode pairs disposed on the all-solid-state electrolyte layer sheet 110 is not particularly limited, the number of the negative electrode 130 and the positive electrodes 120, 123 are not limited as in FIG. 6.

In addition, FIG. 7 is a view showing a cross section taken along line A-A of FIG. 5, wherein the negative electrode 130 is laminated on the front side of the all-solid-state electrolyte layer sheet 110 and the positive electrodes 120, 123 are laminated on the rear side.

Step (5) is a step of folding and stacking all-solid-state electrolyte layer sheets in which the electrodes are laminated so that the electrodes are stacked in a state where each of the electrode is not in contact with each other, and in step (5), an all-solid-state battery in the form of a stack cell may be manufactured.

In this case, each of the electrodes may be stacked at different heights.

In order to fold and stack the electrodes so that they are stacked in a state where they are not in contact with each other, the method of the present disclosure may further comprise a step of cutting the spaced parts in the width direction of the all-solid-state electrolyte layer sheet having the disposed electrodes in a zigzag pattern based on the center line of the spaced part in the longitudinal direction, after step (2) and before step (3), or after step (4) and before step (5).

The cut all-solid-state electrolyte layer sheet 110 may be folded at the spaced part adjacent to another electrode, as a spaced part that is not cut from the electrode adjacent to the cutting part 140 of the distal end in the longitudinal direction, thereby sequentially stacking each electrode and thus stacking the electrodes at different heights.

As the above process is repeated, each electrode may be formed by alternately stacking the negative electrode 130 and the positive electrode 120.

The separation is not particularly limited in terms of the separation distance, and may be sufficient if the distance is such that adjacent electrodes do not contact each other when the spaced part is folded.

Taking FIG. 5 as an example, a folding process of the spaced part without a double fold will be described.

First, based on the center line of the spaced part in the longitudinal direction of the all-solid-state electrolyte sheet 110, the cut all-solid-state electrolyte layer sheet 110 is folded inward along the vertical line 151 based on the front side of the all-solid-state electrolyte sheet at the spaced part adjacent to the other electrode, as a spaced part that is not cut from the electrode adjacent to the cutting part 140 of the distal end in the longitudinal direction. In the above process, the positive electrode 123, the all-solid-state electrolyte sheet 110, and the negative electrode 130 are stacked in that order. Thereafter, the stack stacked in the order of the positive electrode 123, the all-solid-state electrolyte sheet 110, and the negative electrode 130 is folded outward along the horizontal line 152. In the above process, the positive electrode 123, the all-solid-state electrolyte sheet 110, the negative electrode 130, the all-solid-state electrolyte sheet 110, and the positive electrode 120 are stacked in this order. After that, by repeating the process of folding inward along the vertical line 151 and folding outward along the horizontal line 152, an all-solid-state battery in which the negative electrode 130 and the positive electrode 120 are alternately stacked can be manufactured. Specifically, for example, the process of inwardly folding along the vertical line 151 and outwardly folding along the horizontal line 152 in the direction of the arrow shown in FIG. 5 may be repeated.

As the above process is repeated, the negative electrode 130 and the positive electrode 120 may be alternately stacked.

The electrodes of the uppermost part and the lowermost part of the electrode stack stacked with each of the electrodes may be single-sided electrodes coated with electrode active material only on one side of the current collector, and the single-sided electrodes of the uppermost part and the lowermost part of the all-solid-state battery manufactured by the manufacturing method according to an embodiment of the present disclosure may have the same polarity.

In addition, electrodes other than the single-sided electrode may be double-sided electrodes coated with an electrode active material of the same polarity on both sides of the current collector.

FIG. 8 is a view showing an all-solid-state battery 100 manufactured by the method of manufacturing an all-solid-state battery according to an embodiment of the present disclosure, which exemplifies that the uppermost part and the lowermost part are single-sided positive electrodes 123.

Referring to FIG. 8, among the electrodes except for the single-sided positive electrode 123 of the uppermost part and the lowermost part, the positive electrode 120 may be a double-sided positive electrode 120 coated with a positive electrode active material 121 on both sides of the positive electrode current collector 122, and the negative electrode 130 may be a double-sided negative electrode 130 coated with a negative electrode active material 131 on both sides of the negative electrode current collector 132.

The all-solid-state battery is a lithium secondary battery, and is not limited in a positive electrode or a negative electrode, and may be a lithium-air battery, a lithium oxide battery, a lithium-sulfur battery, or a lithium metal battery.

The positive electrode current collector 122 is for supporting the positive electrode active material 121, and is not particularly limited as long as it has excellent conductivity and is electrochemically stable in the voltage range of a lithium secondary battery. For example, the positive electrode current collector 122 may be at least one metal selected from the group consisting of copper, aluminum, stainless steel, titanium, silver, palladium, nickel, alloys thereof, and combinations thereof, and the stainless steel may be surface-treated with carbon, nickel, titanium, or silver, and the alloy may preferably be an aluminum-cadmium alloy. In addition, sintered carbon, a non-conductive polymer surface-treated with an electrically conductive material, or a conductive polymer may be used.

The positive electrode current collector 122 can have minute irregularities formed on its surface to enhance the bonding force with the positive electrode active material 121, and may be formed in various forms such as film, sheet, foil, mesh, net, porous body, foam, nonwoven fabric or the like.

The positive electrode active material 121 may comprise a positive electrode active material 121 and optionally an electrically conductive material and a binder.

The positive electrode active material 121 may vary depending on the type of the all-solid-state battery. For example, the positive electrode active material 121 may be, but is not limited to, layered compounds such as lithium cobalt oxide ($LiCoO_2$) and lithium nickel oxide ($LiNiO_2$) or compounds substituted with one or more transition metals; lithium manganese oxides such as formula $Li_{1+x}Mn_{2-x}O_4$ ($0 \le x \le 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni site type lithium nickel oxide represented by formula $LiNi_{1-x}M_xO_2$ (M=Co, Mn, Al, Cu, Fe, Mg, B or Ga; 0.01≤x≤0.3); lithium manganese composite oxides represented by formula $LiMn_{2-x}M_xO_2$ (M=Co, Ni, Fe, Cr, Zn or Ta; 0.01≤x≤0.1) or $Li_2Mn_3MO_8$ (M=Fe, Co, Ni, Cu or Zn); lithium-manganese composite oxides of spinel structure represented by $LiNi_xMn_{2-x}O_4$; $LiCoPO_4$; $LiFePO_4$; elemental sulfur ($S_8$); and a sulfur-based compound such as $Li_2S_n$ (n=1), an organosulfur compound or a carbon-sulfur polymer ($(C_2S_x)_n$: x=2.5~50, n=2).

The electrically conductive material is a material that acts as a path through which electrons move from the current collector to the positive electrode active material by electrically connecting the electrolyte and the positive electrode active material 121, and is not particularly limited as long as it has porosity and conductivity without causing chemical changes in the lithium secondary battery.

For example, carbon-based materials having porosity may be used as the electrically conductive material. Such carbon-based materials may comprise carbon black, graphite, graphene, activated carbon, carbon fiber, and the like; The electrically conductive material may also comprise metallic fibers such as metal mesh; metallic powder such as copper, silver, nickel, and aluminum; or organic electrically-conductive materials such as polyphenylene derivatives. The electrically conductive materials may be used alone or in combination.

Products that are currently marketed as electrically conductive materials may comprise acetylene black series (products from Chevron Chemical Company or Gulf Oil Company), Ketjen Black EC series (products from Armak Company), Vulcan XC-72 (a product from Cabot Company), and Super P (a product from MMM). For example, acetylene black, carbon black, graphite, etc. may be used.

In addition, the positive electrodes 120, 123 may further comprise a binder. The binder enhances adhesion force between the components constituting the positive electrodes 120, 123 and between them and the current collector, and any binder known in the art can be used as the binder.

For example, the binder may be fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxypropyl cellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

In addition, the negative electrode 130 may comprise an electrically conductive material and a binder as needed, as in the positive electrodes 120, 123. In this case, the negative electrode current collector 132, the electrically conductive material, and the binder are as described above.

The negative electrode active material 131 according to an embodiment of the present disclosure may be a lithium metal, a lithium alloy, or a negative electrode free form.

The negative electrode free form may comprise only the negative electrode current collector 132, or may have a structure coated with a carbon layer containing a binder on the negative electrode current collector.

After step (5), a step of pressurizing the all-solid-state battery 100 manufactured by the manufacturing method may be additionally performed.

The pressurization conditions are not particularly limited, and pressurization conditions used for manufacturing all-solid-state batteries may be used.

In the method for manufacturing an all-solid-state battery according to an embodiment of the present disclosure, since each of the electrodes is manufactured by repeating the folding and stacking process so that they are stacked at different heights in a state in which they are not in contact with each other, there is an advantage in that the manufacturing process is simple. Also, in the prior art, pressurization was performed in each process of stacking the positive electrode, the negative electrode, and the all-solid-state electrolyte layer sheet, whereas in the present disclosure there is also an advantage that the manufacturing process is simple in that the manufactured all-solid-state battery can be pressurized at once. In addition, there is an effect that more layers of electrodes can be stacked in various sizes, and since the positive and negative electrodes are placed at designated locations on the all-solid-state electrolyte layer sheet, it is easy to align the positive and negative electrodes.

Those skilled in the art related to the present embodiment will be able to understand that it may be implemented in a modified form within a range that does not deviate from the essential characteristics of the above description. Therefore, the disclosed methods are to be considered in an illustrative sense rather than a limiting sense. The scope of the present disclosure is shown in the claims rather than the foregoing description, and all differences within the equivalent range should be construed as being comprised in the present disclosure.

DESCRIPTION OF SYMBOL

100: All-solid-state battery
110: All-solid-state electrolyte layer sheet
120: Double-sided positive electrode
121: Positive electrode active material
122: Positive electrode current collector
123: Single-sided positive electrode
130: Double-sided negative electrode
131: Negative electrode active material
132: Negative electrode current collector
140: Cutting part
151: Vertical line
152: Horizontal line

The invention claimed is:

1. A method for manufacturing an all-solid-state battery, comprising steps of:

(1) providing an all-solid-state electrolyte layer sheet;

(2) compartmentalizing the all-solid-state electrolyte layer sheet to accommodate two electrodes disposed apart from each other in a width direction and two or more pairs of electrodes disposed apart from each other in a longitudinal direction;

(3) laminating first electrodes having a first polarity on a front side of the compartmented all-solid-state electrolyte layer sheet in a zigzag pattern, wherein the step (3) is performed by selecting one of a plurality of compartment unit groups connected in a diagonal direction among compartment units compartmentalized on the front side of the all-solid-state electrolyte layer sheet, and then laminating the first electrodes having the first polarity;

(4) laminating second electrodes having a second polarity different from the first polarity on a rear side of the compartmented all-solid-state electrolyte layer sheet on which the first electrodes having the first polarity are not laminated on the front side; and (5) folding and stacking the all-solid-state electrolyte layer sheets in which the first and second electrodes are laminated so that each of the first electrodes and each of the second electrodes are stacked in turn in a state without contacting with each other.

2. The method for manufacturing an all-solid-state battery according to claim 1, further comprising:

a step of cutting spaced parts in the width direction of the all-solid-state electrolyte layer sheet having the disposed electrodes in a zigzag pattern based on a center line of the spaced part in the longitudinal direction, after step (2) and before step (3), or after step (4) and before step (5).

3. The method for manufacturing an all-solid-state battery according to claim 2, wherein the cut all-solid-state electrolyte layer sheet is folded at the spaced part that is not cut starting from the electrode adjacent to a cutting part of a distal end in the longitudinal direction to sequentially stack the first and second electrodes in turn via the all-solid-state electrolyte layer sheet.

4. The method for manufacturing an all-solid-state battery according to claim 1, wherein the first electrode is a negative electrode or a positive electrode.

5. The method for manufacturing an all-solid-state battery according to claim 1, wherein the electrodes of an uppermost part and a lowermost part of the stacked all-solid-state electrolyte layer sheet are single-sided electrodes coated with an electrode active material only on one side of a current collector.

6. The method for manufacturing an all-solid-state battery according to claim 5, wherein the single-sided electrodes of the uppermost part and the lowermost part have the same polarity.

7. The method for manufacturing an all-solid-state battery according to claim 5, wherein the electrodes other than the single-sided electrode are double-sided electrodes coated with an electrode active material having the same polarity on both sides of the current collector.

8. The method for manufacturing an all-solid-state battery according to claim 1, further comprising: a step of pressurization after step (5).

9. The method for manufacturing an all-solid-state battery according to claim 1, wherein a solid electrolyte of the all-solid-state electrolyte layer sheet comprises a sulfide-based solid electrolyte.

10. The method for manufacturing an all-solid-state battery according to claim 1, wherein the first electrode having the first polarity or the second electrode having the second polarity is a negative electrode, and a negative electrode active material is lithium metal or lithium alloy.

* * * * *